(12) United States Patent
Endo et al.

(10) Patent No.: US 12,104,060 B2
(45) Date of Patent: Oct. 1, 2024

(54) CONDUCTIVE RESIN COMPOSITION

(71) Applicant: THREEBOND CO., LTD., Tokyo (JP)

(72) Inventors: Satoru Endo, Tokyo (JP); Mirei Motomatsu, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 214 days.

(21) Appl. No.: 17/754,414

(22) PCT Filed: Aug. 21, 2020

(86) PCT No.: PCT/JP2020/031631
§ 371 (c)(1),
(2) Date: Mar. 31, 2022

(87) PCT Pub. No.: WO2021/065243
PCT Pub. Date: Apr. 8, 2021

(65) Prior Publication Data
US 2022/0372292 A1 Nov. 24, 2022

(30) Foreign Application Priority Data
Oct. 4, 2019 (JP) ................................. 2019-183650

(51) Int. Cl.
*C08L 83/04* (2006.01)
*H01B 1/22* (2006.01)

(52) U.S. Cl.
CPC .............. *C08L 83/04* (2013.01); *H01B 1/22* (2013.01); *C08L 2203/20* (2013.01); *C08L 2205/025* (2013.01); *C08L 2207/324* (2013.01); *C08L 2314/08* (2013.01)

(58) Field of Classification Search
CPC ...................................... C08L 83/04
See application file for complete search history.

(56) References Cited

U.S. PATENT DOCUMENTS

| | | | | |
|---|---|---|---|---|
| 2008/0213578 | A1* | 9/2008 | Endo | C08L 83/00 428/447 |
| 2010/0267885 | A1 | 10/2010 | Harimoto | |
| 2021/0363322 | A1* | 11/2021 | Akaike | C23C 18/44 |

FOREIGN PATENT DOCUMENTS

| | | |
|---|---|---|
| JP | 2002-212426 A | 7/2002 |
| JP | 2004-331742 A | 11/2004 |
| JP | 2008-038137 A | 2/2008 |
| JP | 2009-108312 A | 5/2009 |
| JP | 2010-150399 A | 7/2010 |

OTHER PUBLICATIONS

Office Action dated Jun. 29, 2023 for the corresponding Chinese patent application No. 202080067368.3, with English translation.
Office Action dated Jan. 3, 2023 for the corresponding Chinese patent application No. 202080067368.3, with English translation.
PCT, International Search Report for the corresponding patent application No. PCT/JP2020/031631, dated Nov. 2, 2020, with English translation.
Japanese Patent Office, Notice of Reasons for Refusal mailed Mar. 5, 2024, which was issued for related Japanese Patent Application No. 2021-550419, with full English translation, 6pages.

* cited by examiner

*Primary Examiner* — William D Young
(74) *Attorney, Agent, or Firm* — LUCAS & MERCANTI, LLP

(57) ABSTRACT

A conductive resin composition has low-temperature curability and is excellent in resistance stability during stretching. A conductive resin composition contains:
(A) a polyorganosiloxane having an alkenyl group,
(B) a polyorganosiloxane having a specific structure,
(C) a conductive particle,
(D) a compound having a hydrosilyl group, and
(E) a hydrosilylation catalyst.
The content of the component (B) is 6 to 50 parts by mass based on 100 parts by mass of the component (A).

9 Claims, No Drawings

CONDUCTIVE RESIN COMPOSITION

CROSS REFERENCE TO RELATED APPLICATION

This Application is a 371 of PCT/JP2020/031631 filed on Aug. 21, 2020 which, in turn, claimed the priority of Japanese Patent Application No. 2019-183650 filed on Oct. 4, 2019, both applications are incorporated herein by reference.

TECHNICAL FIELD

The present invention relates to a conductive resin composition which is flexible and is excellent in resistance stability in a stretched state.

BACKGROUND ART

A conductive adhesive has been conventionally used in various electronic parts for the purpose of grounding or conductive adhesion. In recent years, with the spread of electronic devices having various shapes, such as smartphones and wearable devices, the conductive adhesive has been also required to have flexibility, and development of conductive adhesives having excellent stretchability has been promoted (Japanese Patent Laid-Open No. 2002-212426).

SUMMARY OF INVENTION

However, it is difficult to maintain resistance in a stretched state because, for example, if a cured product of a conventional flexible conductive adhesive is stretched, electrical resistance gradually increases to cause insulation. Moreover, the conventional conductive adhesive has a drawback that since the conventional conductive adhesive has a high curing temperature, it cannot be used for parts or members having low heat resistance.

The present inventors have earnestly studied in order to achieve the above object, and as a result, they have found a conductive resin composition which can be cured at a low temperature (80° C.) where members are not damaged and which can suppress an increase in resistance of its cured product even in a state where the cured product is stretched.

Hereinafter, the gist of the present invention will be described.

[1] A conductive resin composition including the following (A) to (E), wherein a content of the component (B) is 6 to 50 parts by mass based on 100 parts by mass of the component (A):
(A) a polyorganosiloxane having an alkenyl group,
(B) a polyorganosiloxane having the following structure

[Formula 1]

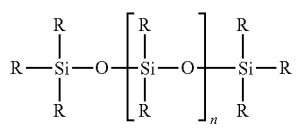

wherein each R is independently an alkyl group and/or an aryl group, and n is an integer of 1 or more,
(C) a conductive particle(s),
(D) a compound having a hydrosilyl group,
(E) a hydrosilylation catalyst.

[2] The conductive resin composition according to [1], wherein the number of carbon atoms of each R of the component (B) is 1 to 10.
[3] The conductive resin composition according to [1] or [2], wherein each R of the component (B) is independently a methyl group and/or a phenyl group.
[4] The conductive resin composition according to any one of [1] to [3], wherein the component (C) has a scaly shape and/or a spherical shape.
[5] The conductive resin composition according to any one of [1] to [4], wherein the component (C) is a silver powder and/or a silver-coated particle(s).
[6] The conductive resin composition according to any one of [1] to [5], wherein a volume resistivity of a cured product obtained by subjecting the composition to curing at 80° C. for 1 hour satisfies (volume resistivity when stretched by 20%/volume resistivity before the stretching)=100 or less.
[7] A cured product formed from the conductive resin composition according to any one of [1] to [6].

DESCRIPTION OF EMBODIMENTS

Details of the present invention will be described.
The conductive resin composition of the present invention contains the following (A) to (E), and a content of the component (B) is in the range of 6 to 50 parts by mass based on 100 parts by mass of the component (A):
(A) a polyorganosiloxane having an alkenyl group,
(B) a polyorganosiloxane having the following structure

[Formula 2]

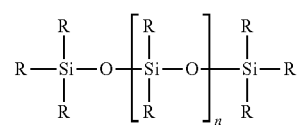

wherein each R is independently an alkyl group and/or an aryl group, and n is an integer of 1 or more,
(C) a conductive particle(s),
(D) a compound having a hydrosilyl group,
(E) a hydrosilylation catalyst.

The present invention provides a conductive resin composition which is cured at a low temperature and has excellent conductive properties (volume resistivity), and which can form a cured product having a suppressed change in resistivity due to stretching.

(A) Component: Polyorganosiloxane Having Alkenyl Group

The polyorganosiloxane having an alkenyl group, which is the component (A) used in the present invention, is not particularly limited, and various ones can be used. A molecular structure of the polyorganosiloxane having an alkenyl group is substantially straight-chained, but may have partially a branched structure. Examples thereof include polydimethylsiloxane with both molecular chain terminals blocked with vinyl groups; copolymers of dimethylsiloxane and diphenylsiloxane with a molecular chain terminal(s) blocked with a vinyl group(s); copolymers of dimethylsiloxane, methylvinylsiloxane and diphenylsiloxane with both molecular chain terminals blocked with vinyl groups; polydimethylsiloxane with one molecular chain terminal blocked with a vinyl group and the other molecular chain terminal blocked with a trimethoxy group; polydimethylsiloxane with one molecular chain terminal blocked with a vinyl group and the other molecular chain terminal blocked with a trimethylsiloxy group; copolymers of dimethylsiloxane, methylvinylsiloxane and diphenylsiloxane with both molecular chain terminals blocked with trimethylsiloxy groups. Among these, polydimethylsiloxane with both molecular chain terminals blocked with vinyl groups is preferable because it has versatility and is excellent in low-temperature curability. These may be used singly or may be used in combination of two or more.

The alkenyl group in the component (A) in the present invention is not limited as long as it undergoes hydrosilylation reaction, but it is preferably $H_2C=CH-Si-$.

A viscosity of the component (A) at 25° C. is preferably 100 to 15,000 cPs, more preferably 1,000 to 10,000 cPs, and most preferably 3,000 to 8,000 cPs. Since the viscosity of the component (A) is 100 cPs or more, a flexible cured product can be obtained, and if the viscosity is 15,000 cPs or less, compatibility with the component (B) is good, and there is no probability of occurrence of liquid separation or the like during storage. The viscosity of the component (A) at 25° C. can be measured using a cone-and-plate viscometer.

A vinyl equivalent of the component (A) is preferably 0.0001 to 20 Eq/kg, more preferably 0.001 to 10 Eq/kg, and most preferably 0.01 to 1 Eq/kg. If the vinyl equivalent of the component (A) is 0.0001 to 20 Eq/kg, low-temperature curability can be maintained. The vinyl equivalent of the component (A) can be determined by Wijs method. Specifically, a carbon double bond is allowed to react with iodine monochloride (excess amount), thereafter, an excess iodine monochloride is allowed to react with potassium iodide, a free iodine is titrated with an aqueous sodium thiosulfate solution to an end point, and from an amount of iodine consumed, the vinyl equivalent can be calculated.

A weight-average molecular weight of the component (A) is preferably 700 or more and less than 150,000, more preferably 2000 or more and less than 130,000, and most preferably 8000 or more and less than 100,000. Since the weight-average molecular weight of the component (A) is 700 or more, a flexible cured product can be obtained, and if it is less than 150,000, viscosity does not become too high when the component (A) is mixed with the component (C), and therefore, a conductive resin composition excellent in coating properties can be obtained. As the weight-average molecular weight (Mw), a value measured by Gel Permeation Chromatography (GPC) using polystyrene as a standard substance is adopted.

Examples of commercial products for the component (A) include polydimethylsiloxane with both molecular chain terminals blocked with vinyl groups manufactured by Gelest, Inc. (viscosity (25° C.): 5000 cPs, vinyl equivalent: 0.04 Eq/kg, weight average molecular weight: 49,500), and polyorganosiloxane having vinyl groups at both molecular chain terminals, e.g., trade names, DMS-V Series manufactured by Gelest, Inc. (e.g., DMS-V31, DMS-V31S15, DMS-V33, DMS-V35, DMS-V35R, DMS-V41, DMS-V42, DMS-V46, DMS-V51, DMS-V52), trade names, PDV Series manufactured by Gelest, Inc. (e.g., PDV-0341, PDV-0346, PDV-0535, PVD-0541, PDV-01631, PDV-01635, PDV-01641, PDV-2335), and trade names, PMV-9925, PVV-3522, EMV-4031 and EDV-2022, manufactured by Gelest, Inc.

(B) Component: Polyorganosiloxane Having the Following Structure

The component (B) in the present invention is polyorganosiloxane having the following structure.

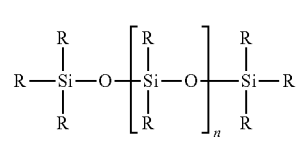

[Formula 3]

wherein each R is independently an alkyl group and/or an aryl group, and n is an integer of 1 or more.

The component (B) is excellent in compatibility with the component (A), and is a major component to suppress resistance increase during stretching. From the viewpoint of compatibility with the component (A), the number of carbon atoms of R is preferably 1 to 10, and more preferably 1 to 8. Specific examples of R include a methyl group, an ethyl group, a propyl group, an isopropyl group, a butyl group, an isobutyl group, a pentyl group, an isopentyl group, a hexyl group, an isohexyl group, a cyclohexyl group, a phenyl group, a methylphenyl group, a heptyl group, an isoheptyl group, an octyl group, an isooctyl group, a nonyl group, an isononyl group, a decyl group and an isodecyl group. From the viewpoint of storage stability, the component (B) is preferably one having one or more selected from the group consisting of a methyl group, an ethyl group, a propyl group, an isopropyl group and a phenyl group, and is most preferably one having one or more of a methyl group and/or a phenyl group. Above all, it is particularly preferable that each R be independently a methyl group (component (B): dimethyl silicone oil) and/or a phenyl group (component (B): diphenyl silicone oil). From the viewpoint of versatility, R at the molecular chain terminals is preferably a methyl group. These may be used singly or may be used in combination of two or more.

A kinematic viscosity of the component (B) is preferably 5 to 5000 $mm^2/s$, more preferably 10 to 3000 $mm^2/s$, and most preferably 50 to 1000 $mm^2/s$. Since the kinematic viscosity of the component (B) is 5 $mm^2/s$ or more, separation over time does not occur when the component (B) is mixed with the component (A), so that the storage stability can be maintained, and if the kinematic viscosity is 5000 $mm^2/s$ or less, the component (B) is easily mixed with the component (C), and the component (C) can be homogeneously dispersed in the conductive resin composition. The kinematic viscosity of the component (B) can be measured by a method in accordance with JIS Z 8803:2011.

An amount of the component (B) added is 6 to 50 parts by mass based on 100 parts by mass of the component (A). The amount thereof is more preferably 6 to 30 parts by mass, and most preferably 6 to 20 parts by mass. If the amount of the component (B) added is 6 parts by mass or more, volume resistivity can be stabilized during stretching, and if it is 50 parts by mass or less, lowering of a volume resistivity before stretching and sedimentation of the component (C) over time as the conductive resin composition can be suppressed.

Examples of commercial products for the component (B) include, but are not limited to, KF-96, KF-96H, KF-96-100CS, KF-50, KF-50-100CS, KF-54, KF-965 and KF-968 manufactured by Shin-Etsu Chemical Co., Ltd.

(C) Component: Conductive Particle(s)

The component (C) in the present invention is a conductive particle(s), and examples thereof include metal powders, such as of gold, silver, copper, nickel and palladium, alloys obtained by combining a plurality of these, such as solder, and plated particles obtained by coating organic polymer particles and metal particles with another metal thin film. Among these, gold particle(s), silver particle(s), copper particle(s), and particle(s) whose surfaces are coated with any of these metals are preferable from the viewpoint that low resistance can be achieved. From the viewpoint of versatility and cost, silver particle(s), copper particle(s), and particle(s) coated with any of these metals are more preferable, and silver particle(s) and particle(s) coated with silver are most preferable because silver is more difficult to oxidize and is easier to handle as compared with copper. These may be used singly or may be used in combination of two or more.

Examples of shapes of the component (C) include spherical, irregular, scaly, needle-like, and arborescent shapes. The component (C) may be used singly or may be used in combination of two or more, but a combination of two or more is preferable because lower resistance and higher thermal conductivity can be achieved. From the viewpoint that viscosity of the conductive resin composition is not excessively increased, and low resistance is exhibited, it is preferable to combine spherical and scaly shapes. If specific gravity of the conductive particle is too heavy, the conductive particle(s) may settle out during storage of the conductive resin composition, and therefore, when spherical particle(s) are used, it is preferable to use particle(s) obtained by coating organic polymer particle(s) with a metal. As the organic polymer particle(s), acrylic particles, styrene particles, butadiene particles, silicone particles, etc. are preferable, and from the viewpoint of versatility, the component (C) is preferably composed of acrylic particle(s) or styrene particle(s) among them. Here, the spherical shape refers to a shape having a sphericity, as indicated by a ratio of a minor diameter to a major diameter (minor diameter/major diameter), of 0.6 to 1.0. A scaly shape refers to a non-spherical and flaky shape.

An average particle diameter of the component (C) is preferably 0.05 to 70 µm, preferably 0.1 to 50 µm, and most preferably 0.5 to 20 µm. Since the average particle diameter of the component (C) is 0.05 µm to more, resistance can be stabilized, and since it is 70 µm or less, occurrence of nozzle or mesh clogging during application of the conductive resin composition by dispensing application, screen printing or the like can be suppressed. Examples of methods for confirming the average particle diameter include a particle size/shape distribution measuring device of laser diffraction scattering type or microsorting control type, and image analysis by an optical microscope, an electron microscope or the like. In the present invention, conductive particles whose average particle diameter had been measured by a laser diffraction scattering method were used.

A specific surface area of the component (C) is preferably 0.01 to 10 $m^2/g$, more preferably 0.1 to 7 $m^2/g$, and most preferably 1 to 5 $m^2/g$. Since the specific surface area of the component (C) is 0.01 to 10 $m^2/g$, the conductive resin composition can be highly filled with the component (C), and therefore, high conductive properties and high heat dissipation properties can be attained. The specific surface area can be calculated from a BET specific surface area.

When the component (C) is scaly, a tap density is preferably 0.5 to 10 $g/cm^3$, more preferably 1 to 8 $g/cm^3$, and most preferably 2 to 5 $g/cm^3$. Since the tap density is 0.5 to 10 $g/cm^3$, the conductive resin composition can be highly filled with the component (C), and therefore, high conductive properties and high heat dissipation properties can be attained. The tap density can be measured in accordance with JIS Z 2512:2012.

For the component (C), a saturated fatty acid and an unsaturated fatty acid can be used as a lubricant. Specific examples include capric acid, undecylic acid, lauric acid, tridecylic acid, myristic acid, pentadecylic acid, palmitic acid, margaric acid, stearic acid, linolenic acid, linoleic acid, palmitoleic acid, oleic acid, and their ester compounds. A lubricant is used in manufacturing for the purpose of prevention of aggregation and improvement in dispersibility when a metal in the form of a solid or a powder is processed, and in the conductive resin composition as well, a lubricant improves wettability between the conductive particle and the resin and dispersibility, and suppresses oxidation of a metal surface, so that higher conductive properties can be attained.

The component (C) is preferably contained in an amount of 10 to 2000 parts by mass, more preferably 50 to 1000 parts by mass, and most preferably 100 to 600 parts by mass, based on 100 parts by mass of the component(A). If the component (C) is contained in an amount of 10 to 2000 parts by mass based on 100 parts by mass of the component (A), volume resistivity of a cured product in the initial stage and during stretching can be stabilized.

(D) Component: Compound Having Hydrosilyl Group

The component (D) in the present invention is a compound having a hydrosilyl group. The component (D) is not particularly restricted as long as it is a hydrosilyl group-containing compound capable of being cured by crosslinking with the compound (A), and various ones can be used, but preferable is an organohydrogen polysiloxane, which is a silicone including straight-chain, branched, cyclic or reticular molecules and containing, in a molecule, a silicon atom to which a hydrogen atom is directly bonded. From the viewpoint of low-temperature curability, preferable is one having, in its molecule, two or more silicon atoms to each of which a hydrogen atom is directly bonded. The hydrogen atom may be bonded to a silicon atom at a terminal or to a silicon atom in a side chain, but from the viewpoint of attaining low-temperature curability and improving toughness of a cured product, the hydrogen atom is preferably bonded to a silicon atom in a side chain.

From the viewpoint of low-temperature curability, a substituent other than the hydrogen atom which is bonded to a silicon atom of the component (D) is preferably an alkyl group having 1 to 6 carbon atoms or a phenyl group, but it may be another group. An amount of the component (D) added is preferably 0.5 to 1.5 equivalents based on one alkenyl group of the component (A). It is more preferably 0.8 to 1.2 equivalents. If the amount of the component (D) added is 0.5 equivalent or more, a crosslink density is properly attained, so that toughness of a cured product can be retained, and if it is 1.5 equivalents or less, foaming due to dehydrogenation reaction can be prevented, so that there is no probability of impairment of characteristics (resin strength, resistance stability) as a cured product of the conductive resin composition.

Also, an amount of the component (D) added is preferably 0.1 to 50 parts by mass based on 100 parts by mass of the component (A). It is more preferably 0.5 to 30 parts by mass. If the amount of the component (D) added is 0.1 part by mass or more, a crosslink density is properly attained, so that toughness of a cured product can be retained, and if it is 50 parts by mass or less, foaming due to dehydrogenation reaction can be prevented, so that there is no probability of impairment of characteristics (resin strength, resistance stability) as a cured product of the conductive resin composition.

Examples of commercial products for the component (D) include trade names by Gelest, Inc., DMS-H013, DMS-H11, DMS-H21, DMS-H025, DMS-H31, DMS-H42, PMS-H03, HMS-013, HMS-031, HMS-064, HMS-071, HMS-991, HMS-992, HMS-993, HDP-111, HPM-502, HMS-151, HMS-301, HQM-105, HQM-107, and trade name by Dow Corning Toray Co., Ltd., DAWSIL SH1107 Fluid (trimethylsiloxy-terminated methyl hydrogen siloxane).

(E) Component: Hydrosilylation Catalyst

The component (E) in the present invention is a catalyst capable of accelerating hydrosilylation reaction, and an optional one can be used. Examples thereof include radical initiators, such as an organic peroxide and an azo compound, and transition metal catalysts, and from the viewpoint of low-temperature curability, preferable are transition metal catalysts, more preferable are a rhodium catalyst, a ruthenium catalyst and a platinum catalyst, and most preferable is a platinum catalyst. Specific examples of the platinum catalyst include platinum-based catalysts, such as chloroplatinic acid, alcohol solutions of chloroplatinic acid, reaction products of chloroplatinic acid and an alcohol(s), reaction products of chloroplatinic acid and an olefin compound(s), reaction products of chloroplatinic acid and a vinyl group-containing siloxane(s), platinum-olefin complexes, and platinum-vinyl group-containing siloxane complexed. Moreover, a solution or dispersion obtained by dissolving or dispersing the catalyst in a solvent such as isopropanol and toluene or in a siloxane oil may be used.

Specific examples of catalysts other than the platinum catalysts include $RhCl(PPh_3)_3$, $RhCl_3$, $Rh/Al_2O_3$, $RuCl_3$, $IrCl_3$, $FeCl_3$, $AlCl_3$, $PdCl_2 \cdot xH_2O$, $NiCl_2$, and $TiCl_4$.

These catalysts may be used singly or may be used in combination of two or more.

A content of the component (E) is preferably in the range of $1 \times 10^{-10}$ to 1 mol, and more preferably $1 \times 10^{-8}$ to $1 \times 10^{-3}$ mol, based on 1 mol of the alkenyl group of the component (A). If the content of the component (E) is $1 \times 10^{-10}$ mol or more based on 1 mol of the alkenyl group of the component (A), low-temperature curability can be maintained, and if the content thereof is 1 mol or less, foaming due to hydrogen gas can be prevented.

A commercial product for the component (E) is, for example, a platinum catalyst manufactured by Umicore Precious Metals Japan K.K., trade name: PT-VTSC-3.0X.

(F) Optional Component: Reaction Inhibitor

In the conductive resin composition of the present invention, a reaction inhibitor may be blended as long as the characteristics of the present invention are not impaired. Use of the reaction inhibitor is preferable because both low-temperature curability and storage stability can be attained. It is preferable to add, as the reaction inhibitor, a compound containing an aliphatic unsaturated bond which does not undergo reaction during storage at room temperature but initiates reaction when heated. Specific examples of the compound containing an aliphatic unsaturated bond include propargyl alcohols, such as 3-hydroxy-3-methyl-1-butyne, 3-hydroxy-3-phenyl-1-butyne, 3,5-dimethyl-1-hexyn-3-ol and 1-ethynyl-1-cyclohexanol, ene-yne compounds, maleic anhydride, and maleic acid esters, such as dimethyl maleate. Among these, a maleic acid ester is preferable from the viewpoint of compatibility with the conductive resin composition. As other reaction inhibitors, organophosphorus compounds can be used. Specific examples thereof include triorganophosphines, diorganophosphines, organophosphones, and triorganophosphites. As other reaction inhibitors, organosulfur compounds can be used. Specific examples of the organosulfur compound include organomercaptans, diorganosulfides, hydrogen sulfide, benzothiazole, thiazole, and benzothiazole disulfide. As other reaction inhibitors, nitrogen-containing compounds can be used. Specific examples of the nitrogen-containing compound include N,N,N',N'-tetramethylethylenediamine, N,N-dimethylethylenediamine, N,N-diethylethylenediamine, N,N-dibutylethylenediamine, N,N-dibutyl-1,3-propanediamine, N,N-dimethyl-1,3-propanediamine, N,N,N',N'-tetraethylethylenediamine, N,N-dibutyl-1,4-butanediamine, and 2,2'-bipyridine. These reaction inhibitors may be used singly or may be used in combination of two or more.

An amount of the reaction inhibitor is preferably 0.01 to 10 parts by mass, more preferably 0.1 to 7 parts by mass, and most preferably 0.3 to 5 parts by mass, based on 100 parts by mass of the component (A). Since the amount of the reaction inhibitor is 0.01 part by mass or more based on 100 parts by mass of the component (A), the conductive resin composition can maintain storage stability, and since it is 10 parts by mass or less, the composition can maintain low-temperature curability.

(G) Optional Component: Filler

For the purpose of improving elastic modulus, fluidity, etc. of a cured product, a filler may be added to the conductive resin composition of the present invention to an extent that the characteristics thereof are not inhibited. A shape of the filler is not particularly limited, but a spherical shape is preferable because not only mechanical strength of a cured product of the conductive resin composition can be improved but also an increase in viscosity can be suppressed. An average particle diameter of the filler is not particularly limited, but it is preferably in the range of 0.1 to 1000 μm, and more preferably 0.5 to 300 μm. Examples of the filler include an organic powder, an inorganic powder, and a metallic powder. Examples of the inorganic powder as the filler include glass, silica, alumina, mica, ceramics, a silicone rubber powder, calcium carbonate, aluminum nitride, a carbon powder, kaolin clay, dried clay minerals, and dried diatomaceous earth. An amount of the inorganic powder blended is preferably about 0.1 to 100 parts by mass based on 100 parts by mass of the component (A). If the amount of the inorganic powder blended is 0.1 part by mass or more, the effect is not reduced, and if it is 100 parts by mass or less, sufficient fluidity of the conductive resin composition can be obtained, and good workability can be obtained.

The silica can be blended for the purpose of adjusting viscosity of the conductive resin composition or improving mechanical strength of a cured product. Preferably, silica having been subjected to hydrophobic treatment with organochlorosilanes, polyorganosiloxane, hexamethyldisilazane, etc. can be used. Specific examples of silica (fumed silica) include commercial products, such as trade names AEROSIL® R974, R972, R972V, R972CF, R805, R812, R812S, R816, R8200, RY200, RX200, RY200S and R202 manufactured by NIPPON AEROSIL CO., LTD.

Examples of the organic powder as the filler include polyethylene, polypropylene, nylon, crosslinked acrylics, crosslinked polystyrene, polyester, polyvinyl alcohol, polyvinyl butyral, and polycarbonate. An amount of the organic powder blended is preferably about 0.1 to 100 parts by mass based on 100 parts by mass of the component (A). If the amount of the organic powder blended is 0.1 part by mass or more, the effect is not reduced, and if it is 100 parts by mass or less, sufficient fluidity of the conductive resin composition can be obtained, and good workability can be obtained.

(H) Optional Component: Solvent

For the purpose of improving fluidity and coating properties, a solvent may be added to the conductive resin composition of the present invention to an extent that the characteristics are not inhibited. From the viewpoint of compatibility with the component (A), the solvent which can be used is preferably one having low polarity, and more preferably a hydrocarbon-based one. Specific examples thereof include benzene, toluene, xylene, n-hexane, isohexane, cyclohexane, methylcyclohexane, normal heptane, mineral spirits, naphthenic, and isoparaffinic solvents, but preferable are naphthenic and isoparaffinic solvents. From the viewpoint of storage stability, an amount of the solvent added is preferably 0.1 to 100 parts by mass, more preferably 1 to 50 parts by mass, and most preferably 5 to 30 parts by mass, based on 100 parts by mass of the component (A).

A commercial product for the solvent is, for example, a naphthenic solvent manufactured by Standard Oil Company, trade name: Exxsol D80.

The conductive resin composition of the present invention is produced by mixing the components. An order of mixing the components is not particularly limited, and the components may be added at once and mixed, or may be added in order and mixed.

By subjecting the conductive resin composition of the present invention to thermal curing, a cured product can be formed. A heating temperature is preferably 50° C. to 100° C., more preferably 50 to 90° C., and most preferably 50 to 80° C. If the heating temperature is 50° C. to 100° C., the composition can be applied also to parts or members which are not resistant to heat, so that expansion into a wide range of fields is possible. A curing time is preferably 10 minutes to 3 hours. It is preferably that a resistance change multiple of a volume resistivity of a cured product obtained by subjecting the conductive resin composition of the present invention to curing at 80° C. for 1 hour satisfies a ratio of volume resistivity when stretched by 20%/volume resistivity before the stretching (initial stage)≤100. If the resistance change multiple (volume resistivity when stretched by 20%/volume resistivity before the stretching (initial stage)) is 100 or less, resistance stability during stretching is good, so that the conductive resin composition can be preferably utilized for applications requiring flexibility during stretching, such as grounding or conductive adhesion of liquid crystal panels, flexible printed wiring boards, and wearable devices.

<Coating Method>

As a method for coating an adherend with the conductive resin composition of the present invention, a known method may be used. Examples thereof include dispensing by an automatic coating machine, spraying, ink jet method, screen printing, gravure printing, dipping, and spin coating. The conductive resin composition of the present invention is liquid at 25° C.

<Use Applications>

Since the conductive resin composition of the present invention exhibits low-temperature curability and excellent conductive properties, it can be utilized for various electronic parts. Above all, resistance stability during stretching is good, and therefore, expansion into applications requiring flexibility, such as grounding or conductive adhesion of liquid crystal panels, flexible printed wiring boards, and wearable devices is preferable.

EXAMPLES

Next, the present invention will be described in more detail with reference to examples, but the present invention is in no way limited to these examples only.

Examples 1 to 3, Comparative Examples 1 to 11

In order to prepare conductive resin compositions, the following components were prepared.

(A) Component: polydimethylsiloxane with both molecular chain terminals blocked with vinyl groups (manufactured by Gelest, Inc.), viscosity (25° C.): 5000 cPs, vinyl equivalent: 0.04 Eq/kg, weight average molecular weight: 49,500

(B-1) Diphenyl silicone oil, trade name: KF-96-100CS (manufactured by Shin-Etsu Chemical Co., Ltd.), kinematic viscosity (25° C.): 100 mm$^2$/s (B-2) Dimethyl silicone oil, trade name: KF-50-100CS (manufactured by Shin-Etsu Chemical Co., Ltd.), kinematic viscosity (25° C.): 100 mm$^2$/s (B'-1) Liquid paraffin, kinematic viscosity (25° C.) 75 mm$^2$/s (B'-2) Polyisobutene, trade name: PERLEAM 46 (manufactured by NOF CORPORATION)

(B'-3) Isopropyl myristate (B'-4) Amino-modified silicone oil, trade name: KF-865 (manufactured by Shin-Etsu Chemical Co., Ltd.), kinematic viscosity (25° C.): 110 mm$^2$/s (B'-5) Mercapto-modified silicone oil, trade name: KF-2001 (manufactured by Shin-Etsu Chemical Co., Ltd.), kinematic viscosity (25° C.): 200 mm$^2$/s (B'-6) Carboxylic anhydride-modified silicone oil, trade name: X-22-168A (manufactured by Shin-Etsu Chemical Co., Ltd.), kinematic viscosity (25° C.): 160 mm$^2$/s (B'-7) Epoxy-modified silicone oil, trade name: KF-101 (manufactured by Shin-Etsu Chemical Co., Ltd.), kinematic viscosity (25° C.): 1,500 mm$^2$/s (C-1): Silver-coated acrylic polymer particle, shape: spherical, average particle diameter: 6.5 μm, specific surface area: 3.2 m$^2$/g (C-2): Silver particle, shape: scaly, average particle diameter: 1.5 μm, specific surface area: 2.1 m$^2$/g, tap density: 3.1 g/cm$^3$, lubricant: oleic acid (D): Crosslinking agent, trimethylsiloxy-terminated methyl hydrogen siloxane, trade name: DOWSIL SH1107 Fluid (manufactured by Dow Corning Toray Co., Ltd.)

(E): Platinum catalyst, trade name: PT-VTSC-3.0X (manufactured by Umicore Precious Metals Japan K.K.), $2.0 \times 10^{-5}$ mol based on 1 mol of alkenyl group of the component (A).

Conductive resin compositions of Examples 1 to 3 and Comparative Examples 1 to 11 were prepared in accordance with the following operation procedure.

The component (A) was weighed in a stirring container, the component (B) was weighed in the stirring container, stirring was performed for 10 minutes, the component (C) was weighed in the stirring container, and stirring was performed for 30 minutes. Further, 10 parts by mass of Exxsol D80 (naphthenic solvent; manufactured by Standard Oil Company) based on 100 parts by mass of the component (A) was added, stirring was performed for 30 minutes, then the component (D) was weighed in the stirring container, and stirring was performed for 30 minutes. Furthermore, 0.75 part by mass of dimethyl maleate (reaction inhibitor) based on 100 parts by mass of the component (A) and the component (E) were weighed, and stirring was performed for 15 minutes. Through the operation procedure, conductive resin compositions of Examples 1 to 3 and Comparative Examples 1 to 11 were each prepared. Details of the amounts for the preparation are in accordance with Table 1 and Table 2, and the numerical values are all expressed in part(s) by mass. Any of the tests was carried out at 25° C.

[Compatibility]

In a 100 ml plastic cup, the component (A) and the component (B) were weighed in a ratio of (A):(B)=10 g:1 g in environment at 25° C., then they were mixed with a glass rod, and presence or absence of compatibility was visually confirmed.

The component (A) and the component (B) are compatible with each other: Good (indicated by circle symbol (o))

The component (A) and the component (B) are not compatible with each other: Poor (indicated by cross symbol (x))

[Curability (80° C.)]

Onto a specimen of a glass plate of 100 mm×100 mm×thickness 2 mm, a polytetrafluoroethylene tape, which has been cut into the same size as that of the glass plate, was stuck, and onto the polytetrafluoroethylene tape, a conductive resin composition of length 100 mm×width 100 mm×thickness 80 μm was applied. Using a constant-temperature bath, the specimen was subjected to curing at 80° C. for 1 hour, then the temperature was returned to room temperature, and the surface of the cured product was touched with a polytetrafluoroethylene rod to confirm presence or absence of curability.

o: The conductive resin composition does not adhere to the polytetrafluoroethylene rod (cured).

x: The conductive resin composition adheres to the polytetrafluoroethylene rod (uncured).

[Volume Resistivity (Initial Stage)]

Using the specimen prepared in the curability test, a volume resistivity was measured by a two-terminal method with a digital multimeter.

Acceptability criterion: $100 \times 10^{-6}$ Ω·m or less

[Resistance Change Multiple During Stretching]

A cured product of the conductive resin composition was removed from the specimen prepared in the curability test, and both ends of the short side of the cured product were pinched with a chuck, then the cured product was stretched until the length of the long side became 60 mm (+20%) from 50 mm, and with the stretched state fixed, a volume resistivity was measured by a two-terminal method with a digital multimeter similarly to the above, and a resistance change multiple was calculated from the following expression.

Resistance change multiple=volume resistivity in 20%-stretched state/volume resistivity before stretching (initial stage)   [Expression 1]

Acceptability criterion: resistance change multiple ≤100.

TABLE 1

|   |   | Example 1 | Example 2 | Example 3 | Comparative Example 1 | Comparative Example 2 | Comparative Example 3 |
|---|---|---|---|---|---|---|---|
| A | Vinyl polysiloxane | 100 | 100 | 100 | 100 | 100 | 100 |
| B-1 | Diphenyl silicone oil | 10 |  | 50 |  |  |  |
| B-2 | Dimethyl silicone oil |  | 10 |  |  |  |  |
| B'-1 | Paraffin |  |  |  | 10 |  |  |
| B'-2 | Polyisobutene |  |  |  |  | 10 |  |
| B'-3 | Isopropyl myristate |  |  |  |  |  | 10 |
| B'-4 | Amino-modified silicone oil |  |  |  |  |  |  |
| B'-5 | Mercapto-modified silicone oil |  |  |  |  |  |  |
| B'-6 | Carboxylic anhydride-modified silicone oil |  |  |  |  |  |  |
| B'-7 | Epoxy-modified silicone oil |  |  |  |  |  |  |
| C-1 | Silver powder | 150 | 150 | 150 | 150 | 150 | 150 |
| C-2 | Silver powder | 350 | 350 | 350 | 350 | 350 | 350 |
| D | Trimethylsiloxy-terminated methyl hydrogen siloxane | 2.5 | 2.5 | 2.5 | 2.5 | 2.5 | 2.5 |
| E | Platinum catalyst | 0.5 | 0.5 | 0.5 | 0.5 | 0.5 | 0.5 |
| Compatibility |  | O | O | O | X | X | O |
| Curability (80° C.) |  | O | O | O | X | X | O |
| Volume resistivity (initial stage) × $10^{-6}$ Ω·m |  | 17.5 | 5.6 | 80 | — | — | 5.5 |
| Resistance change multiple in stretched state |  | 1.5 | 1.7 | 1.5 | — | — | 1500 |

TABLE 2

|   |   | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|
| A | Vinyl polysiloxane | 100 | 100 | 100 | 100 | 100 | 100 | 100 |
| B-1 | Diphenyl silicone oil |  |  |  |  |  |  |  |
| B-2 | Dimethyl silicone oil |  |  |  |  |  | 5 | 60 |
| B'-1 | Paraffin |  |  |  |  |  |  |  |
| B'-2 | Polyisobutene |  |  |  |  |  |  |  |
| B'-3 | Isopropyl myristate |  |  |  |  |  |  |  |
| B'-4 | Amino-modified silicone oil | 10 |  |  |  |  |  |  |
| B'-5 | Mercapto-modified silicone oil |  | 10 |  |  |  |  |  |
| B'-6 | Carboxylic anhydride-modified silicone oil |  |  | 10 |  |  |  |  |
| B'-7 | Epoxy-modified silicone oil |  |  |  | 10 |  |  |  |
| C-1 | Silver powder | 150 | 150 | 150 | 150 | 150 | 150 | 150 |
| C-2 | Silver powder | 350 | 350 | 350 | 350 | 350 | 350 | 350 |

TABLE 2-continued

|   |   | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|
| D | Trimethylsiloxy-terminated methyl hydrogen siloxane | 2.5 | 2.5 | 2.5 | 2.5 | 2.5 | 2.5 | 2.5 |
| E | Platinum catalyst | 0.5 | 0.5 | 0.5 | 0.5 | 0.5 | 0.5 | 0.5 |
| Compatibility | | | | | | | | ○ |
| Curability (80° C.) | | | | | | | | ○ |
| Volume resistivity (initial stage) × $10^{-6}$ Ω · m | | | | | | | | 3.5 |
| Resistance change multiple in stretched state | | | | | | | | 1600 |

It is noted in Table 1 that the conductive resin compositions of Examples 1 to 3 were good in all the curability at 80° C., the volume resistivity in the initial stage, and the resistance change in the stretched state. Since Comparative Examples 1 and 2 had poor compatibility and curability, cured products were not able to be prepared. Comparative Examples 3 to 7 used polyorganosiloxane having a reactive functional group or another plasticizer, but satisfactory results were not able to be obtained in terms of the low-temperature curability and the resistance change during stretching. Comparative Example 8 had large resistance change in the stretched state, and the effect of the present invention was not obtained. Since Comparative Example 9 had a high volume resistivity in the initial stage, it was not satisfactory as a conductive resin composition. Regarding Comparative Example 10 which did not contain the component (B), the resistance change in the stretched state greatly increased, and it can be seen that the component (B) affected resistance change in the stretched state.

INDUSTRIAL APPLICABILITY

The conductive resin composition of the present invention can be cured at a low temperature to form a flexible cured product, and has a small resistance change in the stretched state, and therefore the composition is industrially useful.

The invention claimed is:

1. A conductive resin composition comprising the following (A) to (E) and a maleic acid ester, wherein the conductive resin composition is electrically conductive, and a content of the component (B) is 6 to 50 parts by mass based on 100 parts by mass of the component (A);
   (A) a polyorganosiloxane having an alkenyl group,
   (B) a polyorganosiloxane having the following structure

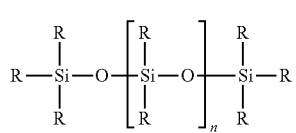

[Formula 1]

wherein each R is independently an alkyl group and/or an aryl group, and n is an integer of 1 or more,
   (C) a scaly conductive particle and a spherical conductive particle, the scaly conductive particle and the spherical conductive particle having a specific surface area of 0.01 to 10 m²/g, and the scaly conductive particle having a tap density of 0.5 to 10 g/cm³,
   (D) a compound having a hydrosilyl group,
   (E) a hydrosilylation catalyst.

2. The conductive resin composition according to claim 1, wherein the number of carbon atoms of each R of the component (B) is independently 1 to 10.

3. The conductive resin composition according to claim 1, wherein each R of the component (B) is independently a methyl group and/or a phenyl group.

4. The conductive resin composition according to claim 1, wherein a resistance change multiple of a volume resistivity of a cured product obtained by curing the composition at 80° C. for 1 hour satisfies volume resistivity when stretched by 20%/volume resistivity before the stretching (initial stage) ≤100.

5. A cured product formed from the conductive resin composition according to claim 1.

6. The conductive resin composition according to claim 1, wherein the scaly conductive particle is a scaly silver particle, and the spherical conductive particle is a spherical silver-coated particle.

7. The conductive resin composition according to claim 1, wherein the scaly conductive particle is a scaly gold particle, a scaly silver particle, or a scaly copper particle, and
   the spherical conductive particle is a spherical acrylic particle, a spherical styrene particle, a spherical butadiene particle, or a spherical silicone particle, wherein the spherical acrylic particle, the spherical styrene particle, the spherical butadiene particle, and the spherical silicone particle are coated with gold, silver, or copper.

8. A conductive resin composition comprising the following (A) to (E) and a maleic acid ester, wherein the conductive resin composition is electrically conductive, and a content of the component (B) is 6 to 50 parts by mass based on 100 parts by mass of the component (A);
   (A) a polyorganosiloxane having an alkenyl group,
   (B) a polyorganosiloxane having the following structure

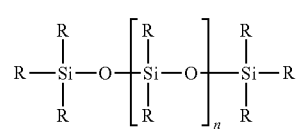

[Formula 1]

wherein each R is independently an alkyl group and/or an aryl group, and n is an integer of 1 or more,
   (C) a silver powder and a silver-coated particle, the silver powder and the silver-coated particle having a specific surface area of 0.01 to 10 m²/g, and the silver powder having a tap density of 0.5 to 10 g/cm³,
   (D) a compound having a hydrosilyl group,
   (E) a hydrosilylation catalyst.

9. The conductive resin composition according to claim 1, further comprising at least one of a naphthenic solvent or an isoparaffinic solvent.

\* \* \* \* \*